United States Patent

[11] 3,580,067

| [72] | Inventors | Melford E. Mandrell;<br>Wayne W. Blaser, Midland, Mich. |
|---|---|---|
| [21] | Appl. No. | 680,128 |
| [22] | Filed | Nov. 2, 1967 |
| [45] | Patented | May 25, 1971 |
| [73] | Assignee | The Dow-Chemical Company<br>Midland, Mich. |

[54] METHOD OF DETERMINING THE RATE OF VAPOR TRANSMISSION THROUGH SHEET MATERIALS
1 Claim, 2 Drawing Figs.

[52] U.S. Cl.................................................. 73/159,
250/106
[51] Int. Cl..........................................G01n 15/08
[50] Field of Search.......................................... 73/159, 73,
76, 38, 40, 40.7; 250/106 (T)

[56] References Cited
UNITED STATES PATENTS

| 2,400,481 | 5/1946 | Brabender.................... | 73/159 |
| 3,135,865 | 6/1964 | Reed et al..................... | 250/106X |
| 3,179,806 | 4/1965 | Dixon et al.................. | 250/106 |
| 3,291,997 | 12/1966 | Albenesius et al............ | 250/106X |

Primary Examiner—Louis R. Prince
Assistant Examiner—Jeffrey Nolton
Attorneys—Griswold & Burdick and Earl D. Ayers ABSTRACT: This invention relates to a method of determining the rate of vapor transmission through sheet materials wherein a defined area of test sheet material fitted over the end of a bottlelike element is exposed to standardized radioactive water under constant conditions of temperature and humidity.

Radioactive water which penetrates the test sheet is, for example, absorbed on calcium chloride. After a known time interval the calcium chloride is analyzed for radioactivity by means of liquid scintillation counting. The vapor transmission rate is calculated from the amount of radioactivity present in the calcium chloride.

PATENTED MAY25 1971 3,580,067
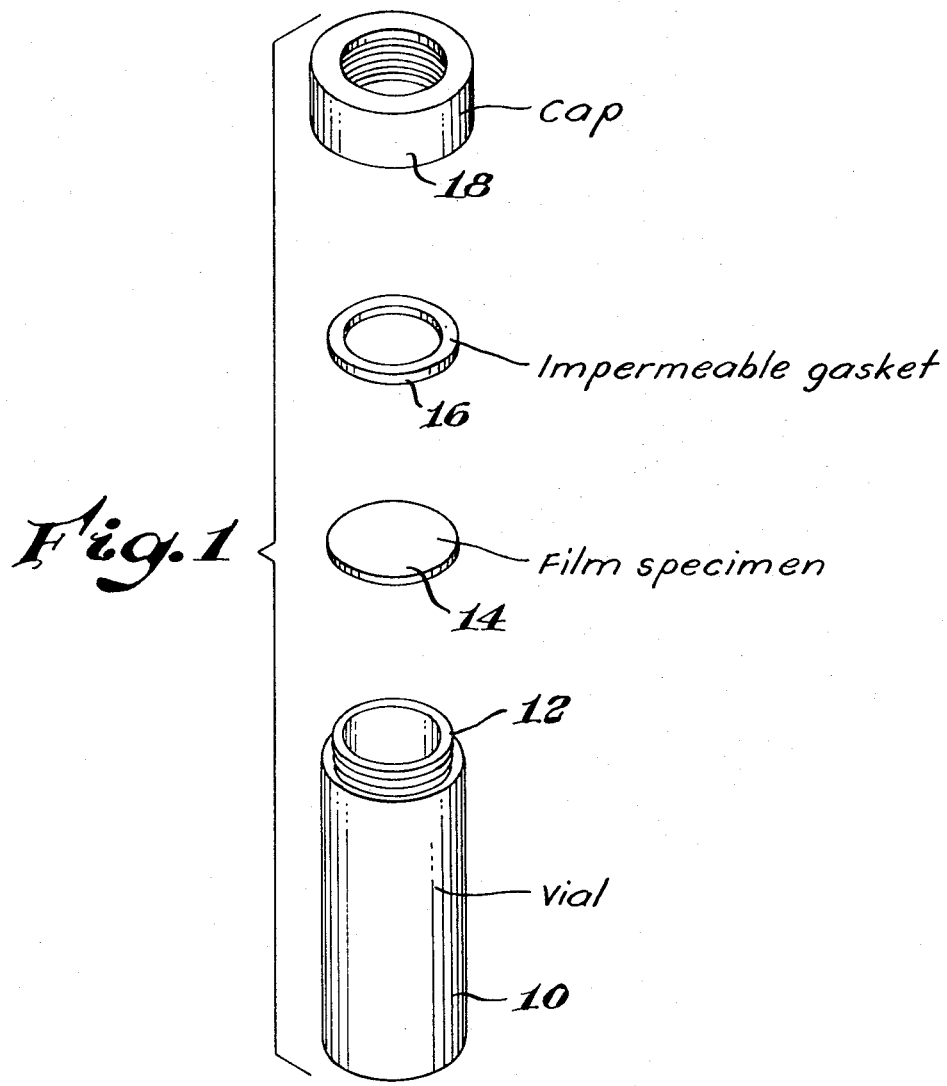
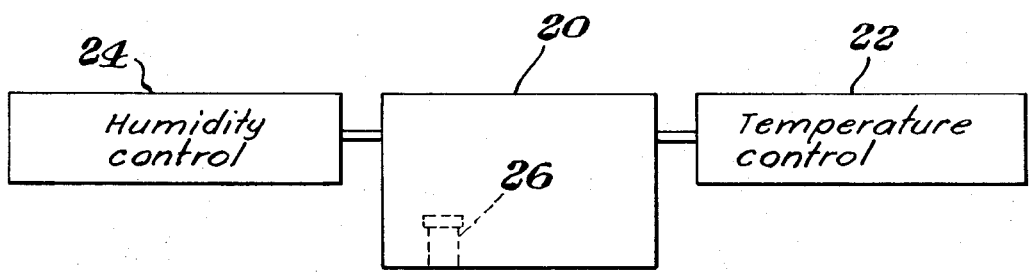
INVENTORS.
Melford E. Mandrell
Wayne W. Blaser
BY
Earl D. Ayers
AGENT

METHOD OF DETERMINING THE RATE OF VAPOR TRANSMISSION THROUGH SHEET MATERIALS

BACKGROUND OF THE INVENTION

This invention relates to a method of determining the rate of vapor transmission through sheet material, and particularly to such a method wherein the transmitted vapor is a radioactive vapor which is absorbed on a desiccant.

At the present time the most widely used method for the determination of water vapor transmission rate involves weighing the transmitted water after it has been absorbed on a desiccating agent. The method is time consuming and depends on variables which are often difficult to control (e.g., balance sensitivity, amount of moisture absorbed on the outside of the container, relative humidity of the laboratory, etc.).

An instrument, the Honeywell W825, has recently been developed for the determination of water vapor transmission rate. This instrument has 100 percent relative humidity on one side of the film while the other side is maintained at a low relative humidity. The exact time elapsed for a relative humidity increase of 1 percent on the low side is detected electronically. From this information the water vapor transmission rate is calculated.

There are known methods in which investigators have measured the water vapor transmission rate using radioactive isotopes. One method is based on the reaction of barium carbide-$C^{14}$ with permeated water to give $Ba(OH)_n$ and acetylene-$C^{14}$. The acetylene-$C^{14}$ is swept from the system thru a counter and measurements are taken at steady-state conditions. This method, by the author's own admission, is neither absolute nor precise.

A second method involves the use of tritiated water, HTO. A mixture of a saturated KCl solution in $H_2O$ and HTO is placed in a permeation cell under a sealed film. $CH_4$ is passed over the film and the amount of water vapor permeating tee film and carried by the methane is recorded. The active water from the vapor of stationary permeation is frozen out. By measuring its activity, the permeability ($g/m^2$/day) is calculated.

Accordingly, a principal object of this invention is to provide an improved method of determining rates of vapor transmission through sheet material.

Another object of this invention is to provide an improved, more sensitive method of determining a rate of vapor transmission through sheet material.

A further object of this invention is to provide an improved method of determining a rate of vapor transmission which is not dependent on chemical reactions.

An additional object of this invention is to provide an improved method of determining a rate of vapor transmission through sheet material which is adapted for use with several samples of sheet material simultaneously.

Yet another object of this invention is to provide an improved method of determining a rate of transmission of vapor through sheet material wherein the result is unaffected by vapor adsorbed on exterior surfaces of containers used in practicing the method and is unaffected by relative humidity of the room in which the determination is made.

In accordance with this invention the rate at which vapor (usually water) permeates sheet material is determined by sealing sheet material over the open end of a vial which preferably contains a desiccant. The sheet material is then exposed for a predetermined time to radioactive vapor (usually water) under controlled conditions of radioactivity of the vapor, temperature, and relative humidity. After the prescribed exposure of the sheet material to the radioactive vapor, the vial is removed from the controlled conditions above, the vial is cooled, then opened and scintillation counting solution added to the vial. The number of disintegrations per minute due to the presence of radioactive water vapor is determined.

The rate of transmission of the vapor is then calculated.

The invention, as well as additional objects and advantages thereof will best be understood when the following detailed description is read in connection with the accompanying drawing, in which FIG. 1 shows in exploded form a vial as used in this invention, and FIG. 2 is a diagrammatical view of a humidity cabinet in accordance with this invention.

Referring to the drawing, there is shown a vial 10 having a threaded upper end 12 adapted to receive a disc 14 of sheet material to be tested. A nonpermeable compressible gasket 16 fits on top of the disc 14. A threaded cap 18 fits over the gasket and disc 14, and is tightened onto the threaded end 12, sealing the disc over the otherwise open end of the vial.

FIG. 2 is a block diagrammatical view of a humidity oven 20 suitable for use in this invention. Temperature control means 22 and humidity control means 24 are shown coupled to the oven which contains a test sample vial 26 and a so-called standard vial (not shown).

A disc of sheet material whose vapor transmission characteristics are to be tested is cut by any suitable means and placed over tee open end of a dry vial 10 which contains calcium chloride or other suitable desiccant. The vial is then sealed by placing the gasket 16 over the disc and then tightening the cap (whose top is cut out) over the gasket and disc. A wax seal may be applied between the vial and the cap. The humidity chamber or oven 20 is prepared by filling the chamber to a prescribed level with radioactive water ($H_2^3O$) and, with the controls set for the desired temperature and humidity, allowed to equilibrate.

The sample vial is then placed in the humidity chamber for a predetermined time interval (1 hour, for instance).

On removal of the vials, and after the exterior of the vial is cleaned, a specified amount of a suitable counting solution (toluene plus a concentrated scintillator known as "Liquifluor," available from Pilot Chemicals, Inc., Watertown, Mass., for example) is poured into the vial and the vial is closed with a regular cap. The vial is then shaken vigorously to assure the dissolving of the calcium chloride.

The sample vial is then "counted" with a liquid scintillation counter. A "blank" vial containing calcium chloride and the same amount of counting solution should also be "counted" to obtain the background radiation activity.

It is necessary to "standardize" the radioactive water used in the measurements to determine the micrograms of $H_2^3O$ per disintegration per minute. This is done by accurately weighing three or four drops of radioactive water into a vial, adding the same amount of counting solution as used with the sample vial, and then converting the observed scintillations per minute to disintegrations per minute. Dividing this result by the weight in grams gives disintegrations per minute per gram. The reciprocal of this figure, multiplied by one million, gives micrograms of $H_2^3O$ per disintegration per minute. This last mentioned figure is used in calculating the transmission rate. It is, of course, necessary to make readings on a "blank" vial containing the same amount of counting solution as the "standardizing" vial but no radioactive water in order to observe the background radiation which is to be subtracted from the total radiation reading of the vial containing the standardizing sample. In determining the vapor transmission rate, the so-called "blank" readings should be subtracted from the sample vial readings and all count per minute readings converted to disintegrations per minute. Then, multiply each value by the standardization factor (micrograms of $H_2^3O$ per disintegration per minute) listed above. This yields the micrograms of water permeating the test material.

In making the determination, several samples are usually tested.

In calculating the water vapor transmission rate, a graph is first plotted showing micrograms of permeated water plotted against exposure time (in hours). A line is drawn through the best fit of the data. The slope of the above mentioned line is then found.

The water vapor transmission rate in grams of water per 100 square inches per 24 hours = the slope mentioned above multiplied by 2.4 times $10^{13}$ divided by the area of exposed film (in in.$^2$). The temperature and relative humidity should also be specified. The accuracy of this method is proportional to the number of vials and time intervals used.

It has been found, in using 5 dram test vials, that 0.5 gram of calcium chloride per vial is usually sufficient.

In three tests involving Mylar film, the correlation between the instant method and the Honeywell W-825 device has been good.

For example:

| $H_2^3O$ method (this invention): | Honeywell W-825 |
|---|---|
| 1.55 | 1.669 |
| 1.59 | 1.64 |
| 2.65 | 2.58 |

The above values all have units of grams/100 in.$^2$/24 hr.

We claim:

1. A method of determining the rate of transmission of water vapor through sheet material, comprising
    a. Sealing a sample of the sheet material to be tested over the open end of each of a plurality of otherwise sealed containers, said containers each containing desiccant material;
    b. Maintaining said containers for predetermined times in a controlled humidity chamber containing radioactive water vapor at predetermined temperature and humidity level while water vapor permeates said sheet material and is absorbed by said desiccant material;
    c. Adding counting solution to said containers and dissolving said desiccant material; and
    d. Measuring the disintegrations per minute occurring in each container as a function of the amount of micrograms of water permeating said sheet material in said predetermined time.
    e. Determining the slope of a straight line passing through the best data represented by points corresponding to micrograms of water permeating the sheet material versus time as heretofore obtained, and
    f. Calculating the water vapor transmission rate in grams of water per hundred square inches per 24 hours by multiplying the above mentioned slope by 2.4 times $10^{13}$ and dividing by the number of square inches of exposed film.

UNITED STATES PATENT OFFICE
CERTIFICATE OF CORRECTION

Patent No. 3,580,067              Dated May 25, 1971

Inventor(s) Melford E. Mandrell et al.

It is certified that error appears in the above-identified patent and that said Letters Patent are hereby corrected as shown below:

Column 1, line 15, "absorbed" should read -- adsorbed --; line 28, "$Ba(OH)_s$" should read -- $Ba(OH)_2$ --; line 36, "tee" should read -- the --. Column 2, line 18, "tee" should read -- the --; line 74, "$10^{13}$" should read -- $10^{-3}$ --. Column 4, line 20, "$10^{13}$" should read -- $10^{-3}$ --.

Signed and sealed this 21st day of September 1971.

(SEAL)
Attest:

EDWARD M. FLETCHER, JR.
Attesting Officer

ROBERT GOTTSCHALK
Acting Commissioner of Patents